United States Patent

[11] 3,608,730

[72] Inventor Emil Blaha
       Cheltenham, Pa.
[21] Appl. No. 863,125
[22] Filed Oct. 2, 1969
[45] Patented Sept. 28, 1971
[73] Assignee Selas Corporation of America
       Dresher, Pa.

[54] DESALINATION APPARATUS
    4 Claims, 3 Drawing Figs.
[52] U.S. Cl. .................................................. 210/321,
                                          210/323, 210/433
[51] Int. Cl. ..................................................... B01d 31/00
[50] Field of Search........................................... 210/22, 23,
                            321, 500, 490, 491, 323, 433

[56] References Cited
    UNITED STATES PATENTS
    1,825,631  9/1931  Horvath ....................... 210/23
    2,987,472  6/1961  Kollshian...................... 210/500 X
    3,156,645  11/1964 Chapin et al.................. 210/321 X

*Primary Examiner*—Frank A. Spear, Jr.
*Attorney*—E. Wellford Mason

CLAIM: A desalination apparatus in which there is provided a thin desalination membrane that is mounted on a rigid, porous support. The membrane and its support are concentrically located in a tube through which water to be treated is forced under pressure.

PATENTED SEP 28 1971 3,608,730

*INVENTOR.*
EMIL BLAHA
BY

DESALINATION APPARATUS

BACKGROUND AND SUMMARY

The present invention relates to the treatment of solutions and more particularly to the desalination of sea water by the reverse osmosis process.

It is well known that fresh water can be produced from sea water or brackish water by the reverse osmosis principle with the use of a cellulosic membrane. With this type of operation, however, the volume of fresh water produced per unit area of membrane has been fairly low because of the necessity to provide a fairly thick membrane. This is because the pores in a cellulosic membrane are in the angstrom unit size and the backing members that have heretofore been used were of such a nature that unless the membrane was fairly thick it would rupture under the pressures required.

It is an object of the present invention to provide apparatus for the treatment of solutions and, more particularly, the desalination of sea water by reverse osmosis.

It is a further object of the invention to provide a porous support for an extremely thin membrane of cellulose or the like which is capable of withstanding a high differential pressure across it.

It is a further object of the invention to provide a compact piece of equipment having a large membrane area with the equipment being made in individual units.

In practicing the invention there is provided a plurality of tubes, preferably of a noncorrosive metal that extend at one end into a manifold. The opposite ends of the tubes extend through a second manifold and communicate with it. In each tube there is received a rigid, porous element, preferably of ceramic, which is covered with a thin, cellulosic membrane. Salt water is pumped under pressure into the first manifold and flows through the annular space between the outer tubes and the membrane to the second manifold to exhaust. As the water is flowing past the membrane, fresh water passes through the membrane into the rigid element, from which it is withdrawn.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

IN THE DRAWINGS

DETAILED DESCRIPTION

Figure 1:
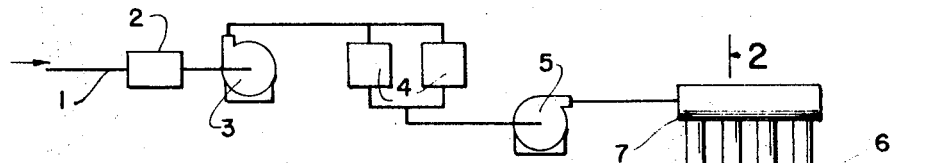
FIG. 1 is the diagrammatic view of the system.
Figure 2:
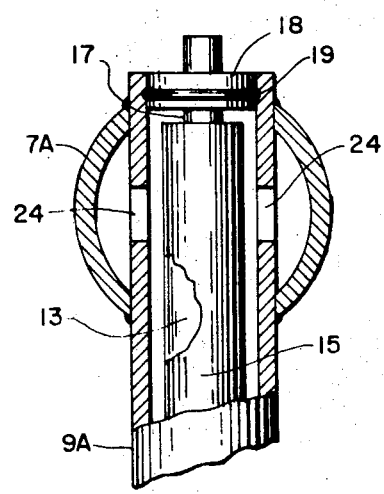
FIG. 2 is a view taken on line 2—2 of FIG. 1 showing a section through the desalination unit.
Figure 2:
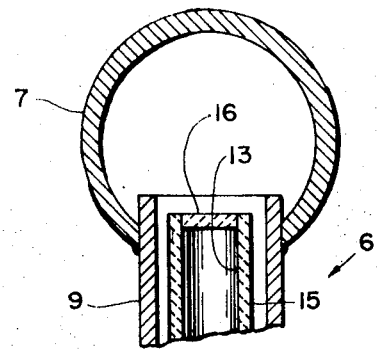

Referring to FIGS. 1 and 2 of the drawings, there is shown a supply pipe 1 through which salt or brackish water to be treated is supplied to the system. The water flows through a strainer 2 to a feed pump 3 which forces the water through filters 4. From there it is forced by a high-pressure pump 5 to a desalination unit 6.

The desalination unit 6 includes an inlet manifold 7 and an outlet manifold 8 which are connected by a plurality of tubes 9. The manifolds and tubes can be formed of suitable pipes. The upper ends of the tubes 9 extend into manifold 7 and are welded to that manifold. The lower ends of tubes 9 extend entirely through manifold 8 and are welded to the manifold at the locations where it goes through, with the lower end 11 being open. The tubes 9 are provided with openings 12 so that they can communicate with the interior of the exhaust manifold. The tubes 9 and the intake and outlet manifolds form a rigid ladderlike frame.

Each of the tubes 9 receives in it an assembly which serves, under suitable pressure, to separate fresh water from the salt water that is supplied. Each of these assemblies includes a rigid, porous element 13 that is preferably made of a microporous ceramic material closely surrounded by a semipermeable membrane 15, preferably of a cellulosic material. The upper end of element 13 is sealed by a nonporous plug 16, while the lower end is sealed by a nonporous plug 17. This latter plug is provided with a flange 18 that is received in the lower open end 11 of tube 9. An O-ring 19 is used to insure that there is a pressuretight seal between the flange and the tube 9. If desired, an additional means such as a wire across the end of a row of tubes 9 can be used to insure that the assemblies will not accidentally come out of the tubes. Plug 17 is provided with an axially extending passage 21 through which liquid which flows to the interior of element 13 can be discharged. The lower ends of the plug 17 can either drain into an open container or they can be connected by means of a tube 22 through which the product liquid from the operation is carried to a point of use.

In the construction of the desalination unit 6, the manifolds and tubes are made from a metal that will not corrode in salt water, such as stainless steel. As an example, manifolds 7 and 8 will be of one inch tubing while tubes 9 will be one-half inch in diameter. Element 13 is preferably a microporous ceramic having pore sizes of one micron or less, although any other rigid material having a similar pore size could be used. This element is about one-quarter inch in diameter and thick enough to stand the pressure differential imposed across it. Tubes 9 and elements 13 can be of any desired length. At present, elements 13 are obtainable in lengths up to about 2 feet.

The semipermeable membrane 15, preferably of cellulose acetate of other cellulose derivative, is permanently attached to the exterior of element 13. This membrane is no more than 1 mil in thickness. It is because of the extreme thinness of membrane 15 that element 13 must be rigid and its pores must be small, otherwise the membrane would rupture at the pores.

In operation, sea water or brackish water that has been filtered is forced by pump 5 into the intake manifold 7 under pressure. The inlet pressure of the water must be at least 375 p.s.i.g., which is required for reverse osmosis of ordinary sea water, and is preferably about 600 p.s.i.g. Back pressure in the outlet from manifold 8 will be held by a regulator 23 at about 550 p.s.i.g. Product water which flows through membrane 15 and its support 13 is collected at atmospheric pressure.

Figure 3:
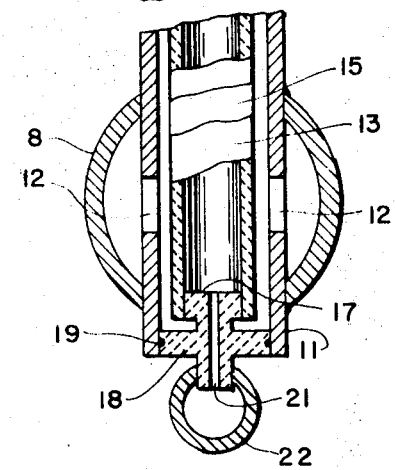
FIG. 3 is a view, similar to FIG. 2, of a different form of the invention.
Figure 3:
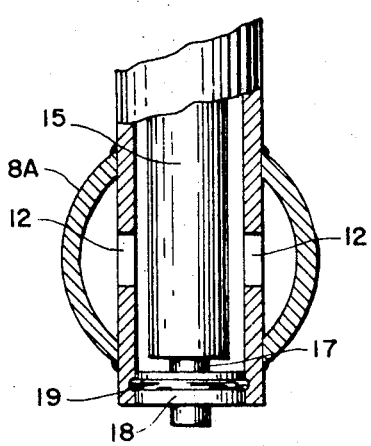

Another form that the invention can take is shown in FIG. 3 wherein the capacity of each unit is substantially doubled. In this case tube 9A extends through both intake manifold 7A as well as through exhaust manifold 8A, and is in communication therewith by openings 24. Each end of tube 9 has in it a membrane assembly like that described above. In this case, the end of the membrane assemblies remote from the ends of tube 9 has on it a fluted cap 25 slightly longer than the diameter of element 13. These caps serve to prevent any possible deflection of the element as the water to be treated flows through the unit.

In operation of this form of the invention, the unit is preferably placed in a horizontal position so that product water will more readily flow out of the openings 21 of plugs 17. When operating, water to be treated is forced under pressure into manifold 7A. The water flows through openings 24, through tubes 9A, and past the membrane assemblies before being exhausted through openings 12 and manifold 8A. Purified water will flow through both membranes to be collected at each end of the unit.

It will be appreciated that the units 6 of each form of the invention can have one or many tubes 9 depending upon the size of the installation and the amount of product water desired. It will also be appreciated that in large installations a number of the units 6, in each form of the invention, can be stacked with the intake manifolds being supplied in parallel. Thus, a large membrane area can be assembled in a relatively small space.

The arrangement of the present apparatus has another advantage. In a multiple unit installation any one unit can be disconnected and serviced without substantially reducing the total product produced. In addition, each of the membrane assemblies can be tested individually and replaced, if necessary, without affecting any other.

While in accordance with the provisions of the statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. Apparatus for the treatment of solutions by reverse osmosis comprising a first inlet manifold, a second exhaust manifold substantially parallel thereto, a tube extending between and connected to said manifolds and in communication therewith, a rigid, porous element in the shape of a hollow cylinder and having one end closed, a semipermeable membrane surrounding and supported by said element, means to mount said element in said tube in concentric relation thereto with its open end adjacent to one manifold, means to supply a liquid to be treated under pressure to said first manifold, means to discharge concentrated liquid from said second manifold, and means to discharge product liquid from the interior of said element.

2. The combination of claim 1 in which there are a plurality of tubes extending between said manifolds and a membrane-covered element in each tube.

3. The combination of claim 1 in which one end of said tube projects beyond one manifold, said one end being open, said element being received in said open end, means to seal said element to said tube adjacent to said open end, said seal including means through which product liquid can be withdrawn from the interior of said element.

4. The combination of claim 1 including a second rigid, porous element in the shape of a hollow cylinder having one end open and being surrounded by a semipermeable membrane, means to mount said second element in concentric relation in said tube with its open end adjacent to the other manifold, and means to discharge product liquid from the interior of said second element.